Patented June 20, 1950

2,512,537

UNITED STATES PATENT OFFICE 2,512,537

MINERAL PELLETS

Mabel W. Zellers, Reading, Pa.

No Drawing. Application July 28, 1947,
Serial No. 764,264

4 Claims. (Cl. 99—2)

This invention relates to improvements in means of feeding minerals which are normally not palatable, yet vitally essential to stock and poultry.

The object of this invention is to render these minerals palatable by providing them in pellet form, using suitable binders which make them palatable, and which may in themselves be essential as vitamins or medicinal ingredients for specific ailments.

Another object is to provide these vitamins or medicinal ingredients in a combination wherein deterioration or harmful chemical reaction, such as might occur in liquid mixtures of the same elements or even in dry impelleted mixtures, is avoided.

Another object is to make palatable feeding pellets or tablets for animals and poultry from a mixture of essential yet not palatable mineral ingredients, proteins, necessary vitamins, and palatable binding material, such as dried molasses solubles with condiments, suitably blending these components before steaming them and pressing them into pellets or tablets of various sizes and shapes.

Other and more specific objects will become apparent in the following detailed description of some illustrative mixtures that may be made in pellets or tablets in accordance with this invention.

Mineral elements as used for poultry and animal feeding are generally highly abrasive elements and cannot be made in pellet form without the addition of animal or vegetable matter or both, as well as a suitable binder. They are also not generally palatable by themselves.

It was discovered that by a proper selection and proportioning of vegetable and animal matter and binders, added to the essential minerals, a mixture could be made which could be pressed into pellets or tablets which would be palatable and very beneficial. Medicinal elements could also be added as ingredients for specific ailments.

For normal feeding purposes, the basic mineral elements, comprising from 25% to 80% of the ingredients, may include calcium carbonate (oyster shell flour), phosphorus (feeding bone meal and bone charcoal), wood charcoal, iron sulphate, cobalt sulphate, sulphur, copper sulphate, potassium iodide, bicarbonate of soda, manganese sulphate, magnesium sulphate, boron, zinc and salt. To this may be added the vitamin elements, such as live yeast culture of bakers' and brewers' yeasts, cheese whey, skimmed milk, dextrose, lactose, soy bean flour, malt flour, riboflavin supplement, solidified vitamin A and solidified vitamin D; and then some dried molasses solubles with several condiments which are highly palatable to animals and poultry, and have a tendency to serve as a binder for the pellets. This mixture is constantly blended in a special agitator, while proteins which serve the purpose of increasing the palatability of the final pellets, may be added, such as processed meat, fish and shrimp meal. More semi-liquid yeasts may then be added to make a crumby mass, which is then conveyed into a blender, to which steam at 10 pounds pressure is added and the material is then compressed into pellets of any suitable shape and size.

Suitable proportions of well known mineral and drug elements may be selected to provide well balanced poultry and animal diets in handy pellet form which is palatable yet highly beneficial, and which can be made in that form by the inclusion of cereals, yeasts or animal protein binders which will supply vitamins and other nutritive values to the mineral and drug elements; and at the same time will serve as a binder and lubricating agent in the process of compressing the abrasive mineral substances into pellets, tablets, etc. of various shapes and sizes. These pellets or tablets are resistant to most extreme weather conditions and do not deteriorate or produce harmful chemical reactions such as might occur in liquid mixtures of the same ingredients; or even in dry loose mixtures thereof openly exposed to the atmosphere.

Thus a finished weather-resistant mineral product palatable for poultry and animal feeding and nutrition may be easily and cheaply made, to provide growth, production, reproduction and maintenance of health in all animals and poultry.

The pellet and tablet thus described is necessarily of special type, due to the relatively high percentage values of the mineral content—in prior practice low percentage values (generally less than five percent) have been the rule; mineral content is generally nonpalatable to both live stock and poultry, and since forced feeding is impracticable, the pellet or tablet must be used under voluntary feeding conditions, the live stock animal generally doing this by "licking" the pellet or tablet, while poultry uses a "pecking" procedure—since in either case, the volume contained in a "lick" or "peck" is exceedingly small, the feeding must take the form of a large number of such "licks" or "pecks" necessarily in successive order; obviously, if the animal or fowl finds the "lick" or "peck" distasteful or unpalatable, further continuation of "licks" and "pecks" will be shunned, so that the pellet and tablet becomes useless for feeding purposes. To avoid this possibility the prior practice has been to retain the percentage value of the unpalatable mineral content very low, to assure that its presence will not render the pellet and tablet unpalatable, the palatable content being comparatively high as an inducement for continuing the voluntary feeding activities.

Compared to such prior practice, the percentage values of the mineral content used in the present invention are high, thus materially increasing the possibilities of the animal or fowl shunning repeated activities on the pellet and tablet, due to the increased amount of the unpalatable content. To avoid this possibility the pellet and tablet are developed in the special manner indicated. The ingredients used include the yeast content, itself of palatable nature, and which thus not only provides for an increase in the percentage of palatable content, but also serves medicinally as a vitamin supply and as a food acceptable to the animal and fowl; the dried molasses content, also palatable, serves as a binder, these agencies providing the incentive for continuing the voluntary feeding activity on the pellet and tablet.

One condition is possible to prevent the continued activities—if the "lick" or "peck" should develop material evidences of the presence of the unpalatable content, the continued activities would cease; such condition could result through faulty distribution of such unpalatable content within the pellet and tablet, as, for instance, a concentration of particles of such content within a small zone such as would be included within the "lick" or "peck." Hence, the distribution of such content must be so equable that all possibilities of concentration are avoided, so that no "lick" or "peck" will disclose the presence of the conditions found objectionable by the animal or fowl.

This equable distribution is provided in following the regimen pointed out in detail above. The selected mineral content, in ground form, is subjected to agitation, thus providing admixture where more than one ingredient forms the mineral content. Yeast content is then added, with the admixture and agitation continued; this adds a fluid component to the admixture, not only adding a food and vitamen element, but an element which tends to prevent the free movement of the ground content, but permitting displacement of ground particles through the agitation. The dried molasses content and the protein content are then added, while the agitation is continued, thus tending to stiffen the content and at the same time distribute it through the agitation. Liquid yeast is now added in presence of agitation, thus preventing setting of the particles, the agitation continuing throughout—at this point the mass has become semi-crumby with the finely ground particles rather heavily coated and tending to preserve their individuality. The mass is now subjected to a blending operation in presence of steam under approximately ten pounds pressure, this operation tending to complete the distribution equally throughout the mass, thus preparing it for the compression action which follows and by which the pellets and tablets are formed.

In other words, when preparing the mass for its final compression into the individual pellets and tablets, the regimen is such as to develop such an equable distribution of the ground particles of mineral content that concentrations of such content particles is practically prevented, so that each of the pellets and tablets formed from the prepared mass can be subjected to the "licking" or "pecking" action during service, and yet the content taken up by the "lick" or "peck" will present its mineral content in such form as to not prove unpalatable to the animal or fowl; hence, the voluntary feeding activities will continue in connection with such pellet or tablet, thus gradually supplying the desired food and medicinal values to the animal or fowl, even though the percentage value of the unpalatable mineral content is relatively high as compared with the values deemed permissible under prior practices in the preparation of such pellets and tablets.

Obviously, the kind and proportions of the ingredients added to the mineral elements, as well as the selection of the latter, may be made through wide ranges, depending on the desired characteristics and the kind of animals or poultry to be fed, without departing from the spirit and scope of this invention, as defined in the appended claims.

What is claimed is:

1. In the production of animal and poultry feeds of the vitamin - mineral - protein and weather-resistant type, wherein the mineral content comprises from 25% to 80% by weight of the content of the feed, and wherein the feed is produced for service in the form of pellets and tablets acceptable palatably under voluntary feeding conditions, the method of producing the feed to render the mineral content palatable to animal stock and poultry, said method consisting in admixing the selected ingredients within an agitator and in accord with a predetermined order as follows: Initially present the mineral content in ground form and agitate, then add the vitamin elements including liquid yeast, then adding a dried molasses content and the protein content, and finally adding additional liquid yeast to form a semi-crumby mass, all the while maintaining agitation, then subjecting the mass to a blending operation in presence of steam under approximately ten pounds pressure, and then forming the pellets and tablets by compression thereby to provide complete equable distribution of the ingredients throughout the pellet and tablet to present these in a form adapted for administration to the animal and fowl by the voluntary "licking" activities of the animal and the voluntary "pecking" activities of the fowl with the equable distribution of the prepared content such as to assure the voluntary acceptance as to palatability by the animal and fowl.

2. A method as in claim 1 characterized in that the mineral content is formed from a predetermined proportional selection from the following ingredients: Calcium carbonate (oyster shell flour), phosphorus (feeding bone meal and bone charcoal), wood charcoal, iron sulphate, cobalt sulphate, sulphur, copper sulphate, potassium iodide, bicarbonate of soda, manganese sulphate, magnesium sulphate, boron, zinc, and salt.

3. A method as in claim 1 characterized in that the vitamin content is formed from a predetermined proportional selection of the following ingredients: Live yeast culture of bakers' and brewers' yeasts, cheese whey, skimmed milk, dextrose, lactose, soy bean flour, malt flour, riboflavin supplement, solidified vitamin A, and solidified vitamin D, and further characterized in that the protein content is formed from a predetermined proportional selection from the following: Processed meat, fish, and shrimp meal.

4. A method as in claim 1 characterized in that the dried molasses content is formed from dried molasses soluble with several condiments highly palatable to animal stock and poultry and tends to serve as a binder for the pellet.

MABEL W. ZELLERS.

REFERENCES CITED

The following references are of record in the file of this patent:

UNITED STATES PATENTS

| Number | Name | Date |
|---|---|---|
| 2,162,609 | Dawe | June 13, 1939 |
| 2,168,532 | McMath | Aug. 8, 1939 |
| 2,303,466 | Hunter | Dec. 1, 1942 |

FOREIGN PATENTS

| Number | Country | Date |
|---|---|---|
| 12,205 | Great Britain | of 1899 |
| 14,829 | Great Britain | of 1915 |
| 289,289 | Great Britain | of 1928 |
| 382,480 | Great Britain | of 1932 |